United States Patent

Mulchandani et al.

[11] Patent Number: 6,112,025
[45] Date of Patent: *Aug. 29, 2000

[54] SYSTEM AND METHOD FOR DYNAMIC PROGRAM LINKING

[75] Inventors: Nand M. Mulchandani, Menlo Park; Daniel D. Grove, Mountain View, both of Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/622,560

[22] Filed: Mar. 25, 1996

[51] Int. Cl.[7] .................................................. G06F 9/45
[52] U.S. Cl. ............................................... 395/709
[58] Field of Search .................................... 395/712, 702, 395/685, 709; 709/305

[56] References Cited

U.S. PATENT DOCUMENTS

| | | | |
|---|---|---|---|
| 5,280,617 | 1/1994 | Brender et al. | 395/700 |
| 5,375,241 | 12/1994 | Walsh | 395/712 |
| 5,495,612 | 2/1996 | Hirayama | 395/712 |
| 5,519,866 | 5/1996 | Lawrence et al. | 395/710 |
| 5,625,783 | 4/1997 | Ezekiel et al. | 395/352 |
| 5,634,058 | 5/1997 | Allen et al. | 395/712 |
| 5,659,751 | 8/1997 | Heninger | 395/685 |
| 5,675,803 | 10/1997 | Priesler et al. | 395/704 |
| 5,812,848 | 9/1998 | Cohen | 395/685 |

Primary Examiner—Alvin E. Oberley
Assistant Examiner—Peter Stechor
Attorney, Agent, or Firm—Pennie & Edmonds LLP

[57] ABSTRACT

In a system for dynamically linking a compiled procedure to referenced object components during execution of the compiled procedure, a native code loader loads the compiled procedure into a user's address space, and replaces a first instruction in the compiled procedure that references a first object component with a replacement instruction that invokes execution of a dynamic resolution procedure. While executing the compiled procedure, execution of the replacement instruction invokes execution of the dynamic resolution procedure. The dynamic resolution procedure locates the first object component, replaces the replacement instruction in the compiled procedure with a patch instruction, corresponding to the first instruction, that references the located first object component. The dynamic resolution procedure also resets a program counter value associated with execution of the compiled procedure so that when the dynamic resolution procedure returns back to the compiled procedure, the patch instruction is executed next. In a preferred embodiment, the native code loader replaces a shadow instruction, immediately following the first instruction in the compiled program with a NOP instruction. The dynamic resolution procedure, after it locates the first object component, replaces the NOP instruction with the shadow instruction if the shadow instruction does not reference an object component, and otherwise replaces the shadow instruction with a second replacement instruction that invokes execution of the dynamic resolution procedure.

21 Claims, 9 Drawing Sheets

SYSTEM AND METHOD FOR DYNAMIC PROGRAM LINKING

The present invention relates generally to computer systems in which procedures are linked to one another at run time, and particularly to a system and method in which a compiled procedure is dynamically linked at run time to other procedures in such a way that after the linking process is completed, the linked program executes as efficiently as if the program had been linked to the other procedures at compile time.

BACKGROUND OF THE INVENTION

A compiled program is typically linked to all programs called by that program at compile time. That is, the locations of all programs called by the compiled program are resolved by a compiler, or by a linker program, and stored in a data structure within the compiled program. In most systems, this linking process is performed at compile time, which means it is performed prior to execution of a program.

The Java virtual machine (which is distributed and licensed by Sun Microsystems, Inc.), as well as some other interpreted language systems, dynamically link programs while they are running. In such systems, if during execution of a first program the first program executes a procedure call to a second program, the virtual machine dynamically locates the second program and stores the location of the second program in a table (called a constant pool) so that later references to the second program can be resolved simply by reference to the table. Calls to the second program are then resolved by invoking the procedure at the location indicated in the table.

Referring to FIG. 1, in a computer system 100 that executes Java bytecode programs using a Java virtual machine, dynamic linking of programs is handled by two procedures: a Java class resolver 102 and a Java class loader 104. The Java class loader 104 loads object classes into a work space 106 and, among other things, maintains a table 108 that references all loaded object classes. A bytecode interpreter 110 executes programs 112 that have been loaded into the work space 106 and calls the Java class resolver 102 whenever the interpreter encounters a procedure invoke instruction that has not been previously executed.

The Java class resolver 102 performs the actual dynamic linking of programs by determining if an invoked method is already loaded and calling the class loader 104 if the invoked method is not already loaded. After a reference to the invoked program is resolved, the location of the called procedure is stored in the calling program's constant pool 114, the Java "invoke" instruction in the calling procedure is marked so that future executions of the instruction do not invoke the Java class resolver 102, and the invoke instruction is executed. The invoke instruction, having been resolved, directly invokes the procedure at the location referenced in the calling procedure's constant pool 114.

The Java virtual machine uses the same dynamic linking procedure as just described to resolve references to any object component, not just object class methods. In particular, the Java interpreter detects when an instruction that references an object component is being executed for the first time and calls the Java class resolver to resolve the object component reference. After the reference to the object component has been resolved by the Java class resolver 102, the instruction is executed and is also marked so that future executions of the instruction do not invoke the Java class resolver.

The class loader 104 retrieves object classes either from a locally stored class repository 120, or from remotely located class repositories 122 accessed by a network or Internet communications port 124.

The terms "native program" and "native code" are used in this document to refer to computer programs and instructions that are designed to be directly executed by computers using a specific computer architecture. For instance "68000" code is a type of native code that is designed for execution on systems using Motorola 68000 series microprocessors, and SPARC code is a type of native code that is designed for execution on computer systems using Sun Microsystems' SPARC series microprocessors. Java bytecode programs, by way of contrast, are computer architecture neutral in that they can be executed on any computer system that has a Java virtual machine.

It is difficult to replicate in programs compiled into native code the dynamic linking accomplished by the Java class resolver. More specifically, dynamic linking in a compiled program is relatively easily accomplished. What is difficult is to perform dynamic linking in compiled programs in a computationally efficient manner. An obvious way to implement dynamic linking in compiled programs is to code every procedure call in the program that could possibly be the first instruction to call to a particular program with the following instructions:

If the reference to the Called Program in the constant pool is null
{
Call Compiled Program Resolver
}
Invoke Called Program at location indicated in constant pool where the "Compiled Program Resolver" is a program that resolves the reference to the Called Program and updates the constant pool for the calling program to reference the Called Program's location.

The primary problem with the above method for dynamically linking a compiled program at run time is that all procedure calls made using the above "If-Then" set of instructions must execute at least two instructions (i.e., a load instruction and a conditional branch instruction) corresponding to the "If" test prior to executing the procedure call instruction. In fact, in most native code languages the "If-Then" instructions would add three instructions (i.e,. a load, a compare and a conditional branch) prior to the execution of the procedure call instruction. This is very computationally inefficient. A secondary problem with this methodology is that it results in "bloated code" in that the size of a compiled program with this type of dynamically linked procedure calls will be substantially larger than the same compiled program without dynamic linking.

SUMMARY OF THE INVENTION

In summary, the present invention is a system and method for dynamically linking a compiled procedure to referenced object components during execution of the compiled procedure. A native code loader loads the compiled procedure into a user's address space, and replaces a first instruction in the compiled procedure that references a first object component with a replacement instruction that invokes execution of a dynamic resolution procedure. While executing the compiled procedure, execution of the replacement instruction invokes execution of the dynamic resolution procedure.

The dynamic resolution procedure locates the first object component, replaces the replacement instruction in the compiled procedure with a patch instruction, corresponding to the first instruction, that references the located first object component. The dynamic resolution procedure also resets a program counter value associated with execution of the compiled procedure so that when the dynamic resolution procedure returns back to the compiled procedure, the patch instruction is executed next.

In a preferred embodiment, the native code loader replaces a shadow instruction, immediately following the first instruction in the compiled program with a NOP instruction. The dynamic resolution procedure, after it locates the first object component, replaces the NOP instruction with the shadow instruction if the shadow instruction does not reference an object component, and otherwise replaces the shadow instruction with a second replacement instruction that invokes execution of the dynamic resolution procedure.

When the dynamic resolution procedure locates the first object component, it links the compiled procedure to the first object component by storing a memory address value associated with the loaded first object component in a constant pool associated with the compiled procedure. In addition, the dynamic resolution procedure determines whether the object class associated with the first object component has been loaded into the user's address space, and when that determination is negative, it initiates the process of loading the associated object class into the user's address space.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
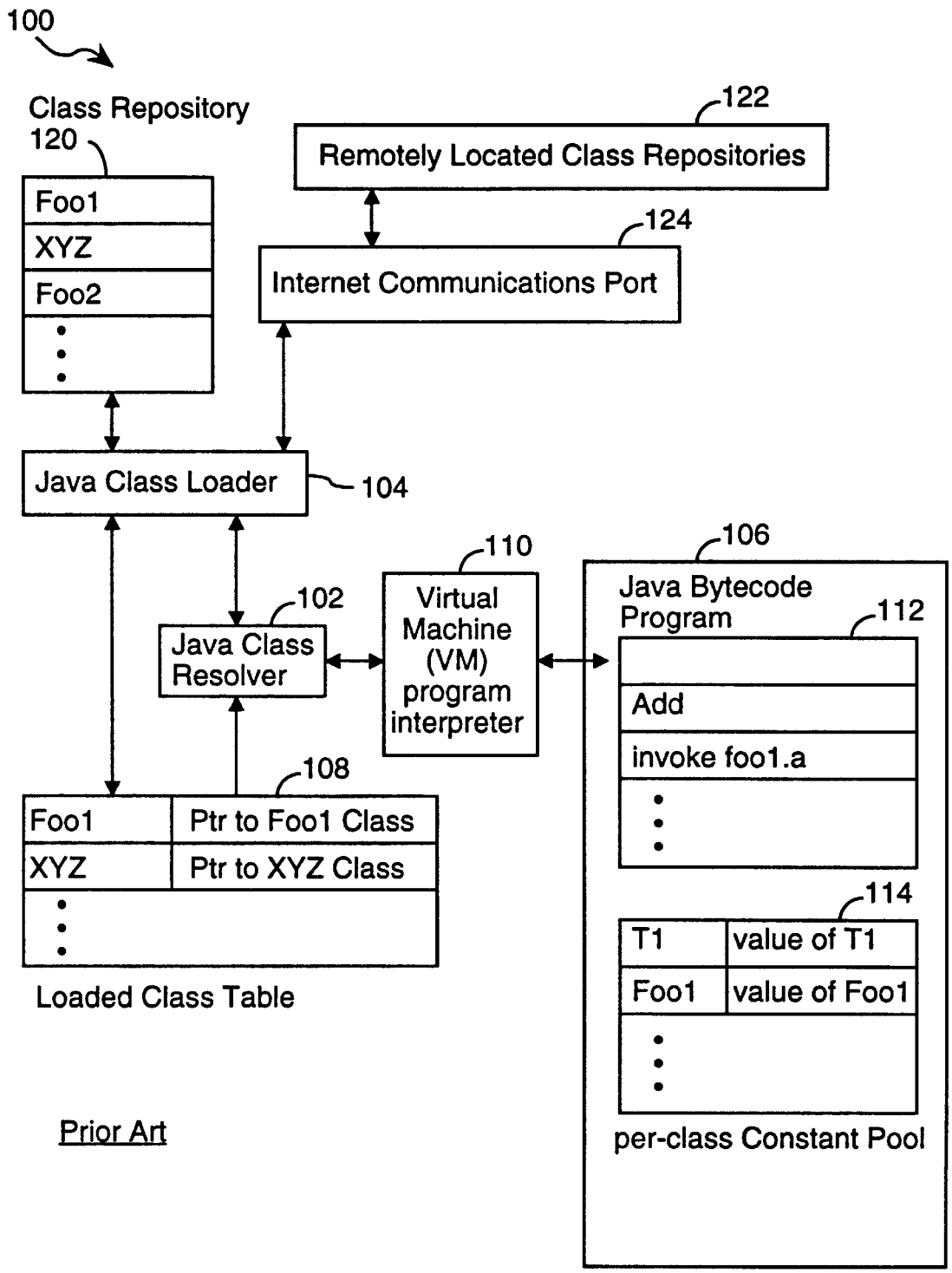
FIG. 1 is a conceptual representation of a computer system using a Java virtual machine, with particular emphasis on the components that participate in dynamically linking programs at run time.
Figure 2:
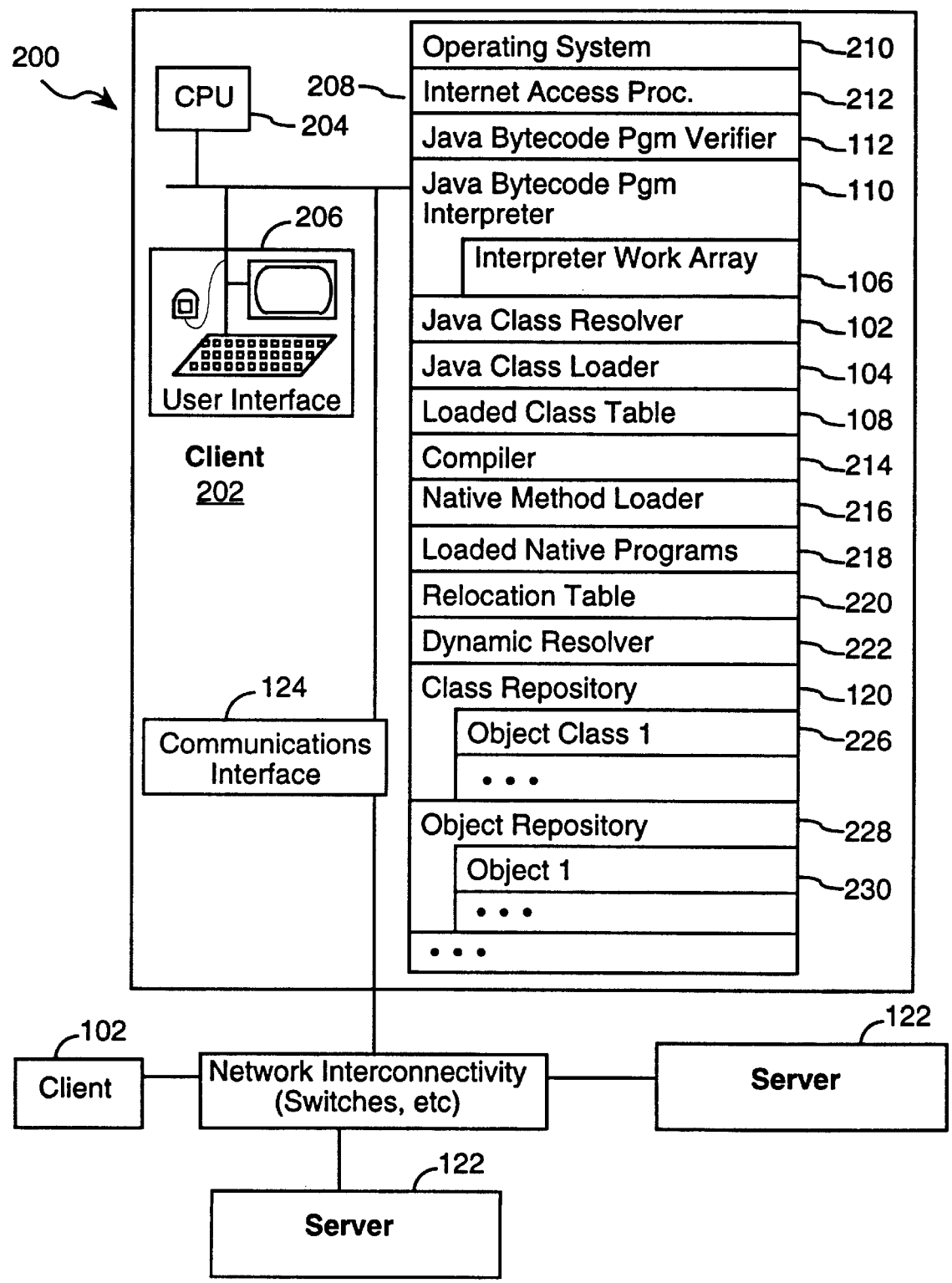
FIG. 2 is a block diagram of a computer system employing a preferred embodiment of the compiler and dynamic link resolver of the present invention.

Referring to FIG. 2, there is shown a computer system 200 that includes the computer system components of FIG. 1, plus additional components for loading and executing native code programs as well as Java bytecode programs. More specifically, computer system 200 includes at least one client computer 202 having central processing unit 204, a user interface 206, a communications interface 124 such as the aforementioned Internet communications port, and memory 208.

Memory 208 stores:
an operating system 210;
an Internet communications manager program 212, such as the HotJava (a trademark of Sun Microsystems, Inc.) Web browser program;
a Java bytecode program verifier 112 for verifying whether or not a specified program satisfies certain predefined integrity criteria;
a Java bytecode program interpreter 110 for executing Java bytecode programs loaded into an interpreter work array 106;
Java class resolver 102, discussed above;
a Java class loader 104, which loads object classes into a user's address space and utilizes the bytecode program verifier to verify the integrity of the methods associated with each loaded object class;
a Java class table 108, discussed above;
a compiler 214 for compiling Java bytecode programs into native code programs;
a native method loader 216 for loading native programs into a user's address space;
loaded native programs 218, that have been loaded into memory by the native method loader 216;
relocation tables 220, where each relocation table is a data structure used during execution of native programs in accordance with the preferred embodiment of the present invention;
a dynamic resolver procedure 222, which dynamically links a compiled program to object components during execution of the compiled program;
at least one class repository 120, for locally storing object classes 226 in use and/or available for use by user's of the computer 202;
at least one object repository 228 for storing objects 230, which are instances of objects of the object classes stored in the object repository 120.

In the preferred embodiment the operating system 210 is an object-oriented multitasking operating system that supports multiple threads of execution within each defined address space. In the preferred embodiment, the client system 202 is a Sun Microsystems SPARC Workstation using a SPARC microprocessor and the Solaris operating system. However, the present invention is equally applicable to computer systems using other hardware and operating system platforms.

Explanations of these components of system 200 are provided next.

For the purposes of this document, the term "shadow instruction" is defined to mean the instruction immediately following a specified "primary" instruction.

Figure 3:
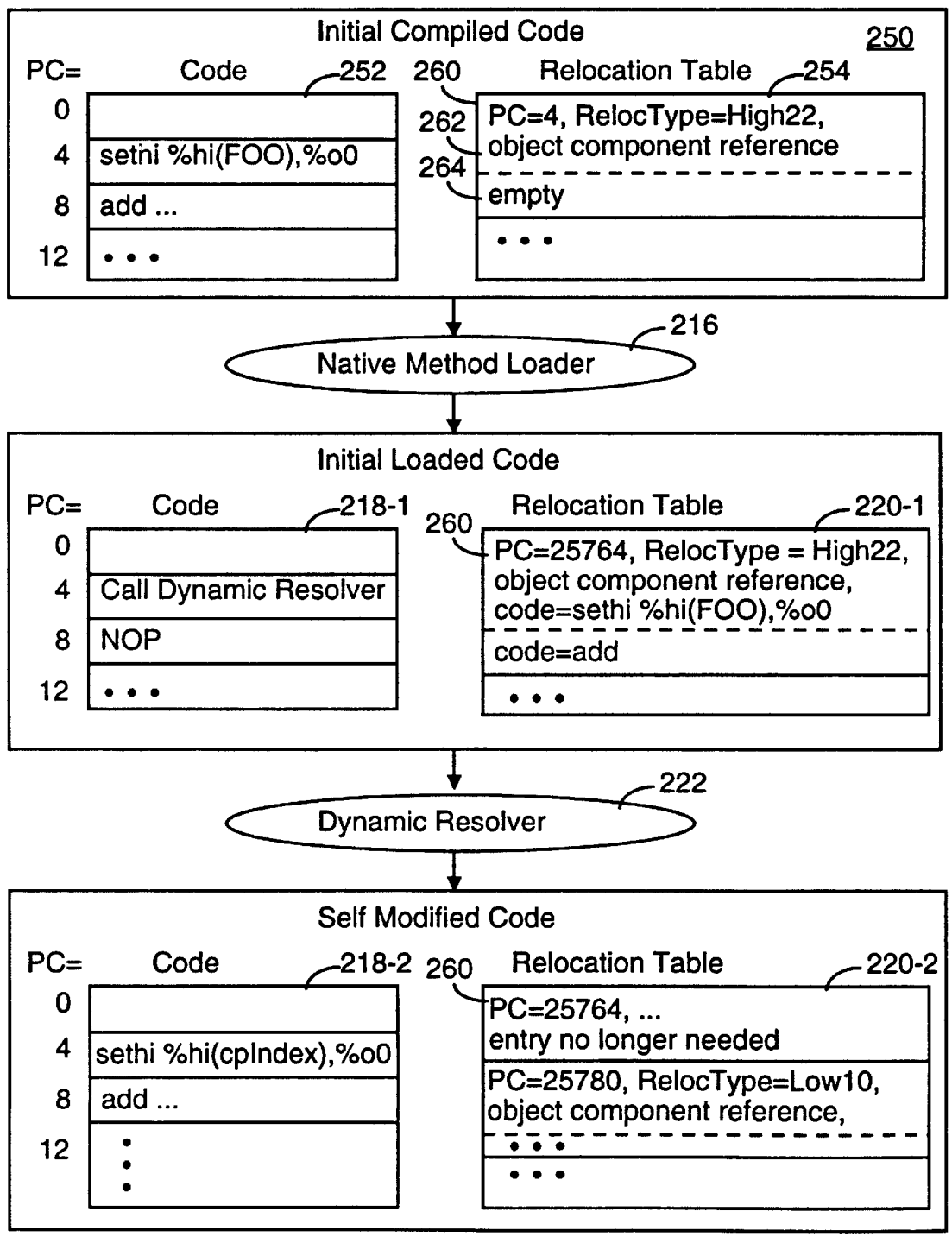
FIG. 3 represents a small segment of a compiled program after compilation, after loading by the native method loader, and after patching during execution of the program.

Referring to FIG. 3, in the object code file 250 generated by the Java to native code compiler 214 includes an object code array 252 and a relocation table 254. When the object code file 250 is initially generated, the relocation table 254 includes one entry 260 for each instruction of the compiled program that references an object component.

In the preferred embodiment, each entry 260 of the relocation table includes a patch instruction component 262 and an empty shadow instruction component 264. The patch instruction component 262 stores the relative program counter (PC) value for the corresponding object code instruction (i.e., the relative address of the instruction in the object code array), a relocation type value, and an object component reference. The object component reference specifies the object component that needs to be dynamically linked to the compiled program.

The relocation type of each patch instruction defines which bits of the instruction to be patched (i.e. dynamically modified during execution of the program) are provided by the original object code instruction and which bits need to be replaced by the address of a constant pool entry.

Furthermore, th e object cod e array 252 in the initial compiled file 250 includes the object code for t he instructions that will be dynamically modified during program execution.

FIG. 3 next shows contents of the object code array 218-1 and relocation table 220-1 after the y have been loaded into memory by the native method loader 216. As shown, the native method loader 216 copies a primary instruction referenced by a relocation table entry 260, as well as its shadow instruction, into that relocation table entry 260. In the preferred embodiment, the native method loader copies into the relocation table 220-1 all instructions that reference object components and their shadow instructions. In addition, the relative program counter values in the relocation table entries are replaced during loading of the relocation table with the absolute program counter values for the corresponding instructions by adding the base address of the loaded native code to all the relative program counter values initially stored in the relocation table.

Further, each primary instruction referenced by a relocation table entry 220-1 (with one exception noted below) is replaced by the native code loader 216 with a procedure call to the dynamic resolver, and its shadow instruction (i.e., the next instruction after the primary instruction referenced by the relocation table entry) is replaced by a NOP instruction (i.e., an instruction which leaves the state of the computer unchanged). However, when a sequence of two or more consecutive instructions each reference object components, only the first instruction (and its shadow) in that sequence are replaced by the native method loader with a call to the dynamic resolver and a NOP instruction, respectively.

The reason that the shadow instruction is replaced with a NOP instruction is as follows. In SPARC computers, the shadow instruction for every call instruction is called a "delay slot" instruction, and that delay slot instruction must actually be executed before the call instruction is executed. To avoid the side affects of executing the delay slot instruction, the native method loader 216 replaces it with a NOP instruction until after the dynamic linking process for the associated patch instruction has been completed. Moreover, when the shadow instruction of an instruction that has been relocated to the relocation table 220-1 is also referenced by a separate entry in the relocation table, that shadow instruction is not replaced by a procedure call to the dynamic resolver because the NOP instruction is needed in that position.

In summary, the native method loader 216 modifies the compiled program so that most instructions which reference external object components are replaced by either a procedure call to the dynamic resolver, or by a NOP instruction.

Next, FIG. 3 shows that after the dynamic resolver 222 is called by execution of the instruction at location PC=4, the instruction in the native code array 218-2 has been modified. In particular, the procedure call to the dynamic resolver has been replaced with a modified version of the original object code instruction at location PC=4. The modified instruction includes the bits of the original object code instruction identified by the relocation type value in the corresponding relocation table entry, plus some bits identifying the constant pool index of constant pool entry that references the object component to be used by the instruction. The NOP instruction is simply replaced by the original shadow instruction, unless the shadow instruction itself contains a reference to an external object component. In that case, the NOP instruction replaced by a call to the dynamic resolver and its shadow instruction is replaced by a NOP instruction.

Figure 4:
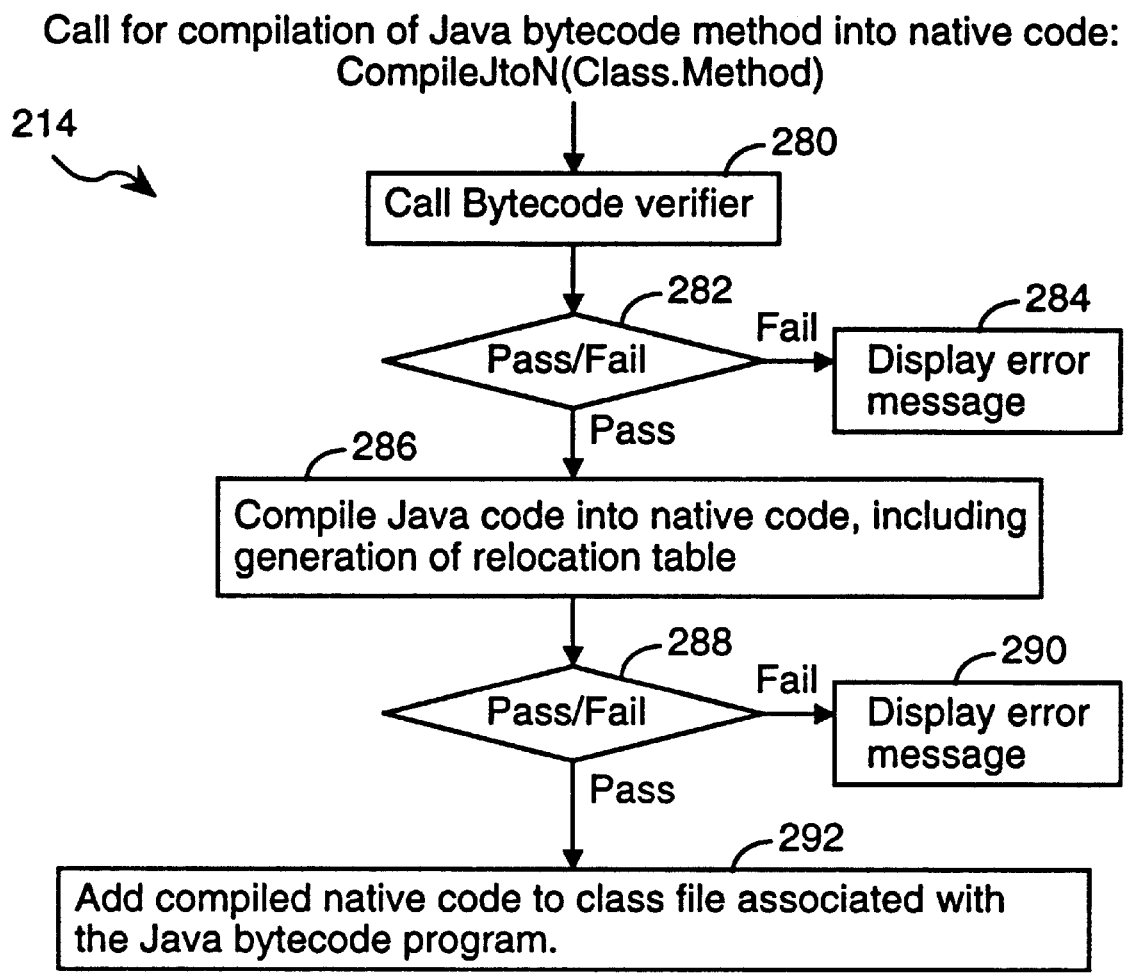
FIG. 4 is a flow chart of the steps taken to compile a Java bytecode program into native code and then execute it.

Referring to FIG. 4, in the preferred embodiment the Java to native code compiler 214 is typically used to compile into native code a Java bytecode method in an existing class file. The compiler 214 begins by calling the Java bytecode verifier (280) to verify the integrity of the method to be compiled. The Java bytecode verifier determines whether the specified method conforms to predefined stack usage and data usage restrictions that ensure that verified methods cannot overflow or underflow the executing computers oper- and stack and that all instructions utilize only data of known data types. As a result, Java language programs cannot create object pointers and generally cannot access system resources other than those resources which the user explicitly grants it permission to use.

If the verifier indicates that the specified method failed the verification test (282-Fail), an error message is displayed and compilation is prevented (284). Otherwise (282-Pass), the Java bytecode method is compiled into native code and a relocation table is also generated (286). As explained earlier, the relocation table includes an entry for each instruction of the Java method that references an object component.

If the compilation step fails for any reason (288-Fail), an error message is displayed (290). Otherwise, the compiled native code, including the associated relocation table, is added to the class file in which the associated Java bytecode method is located (292).

Figure 5:
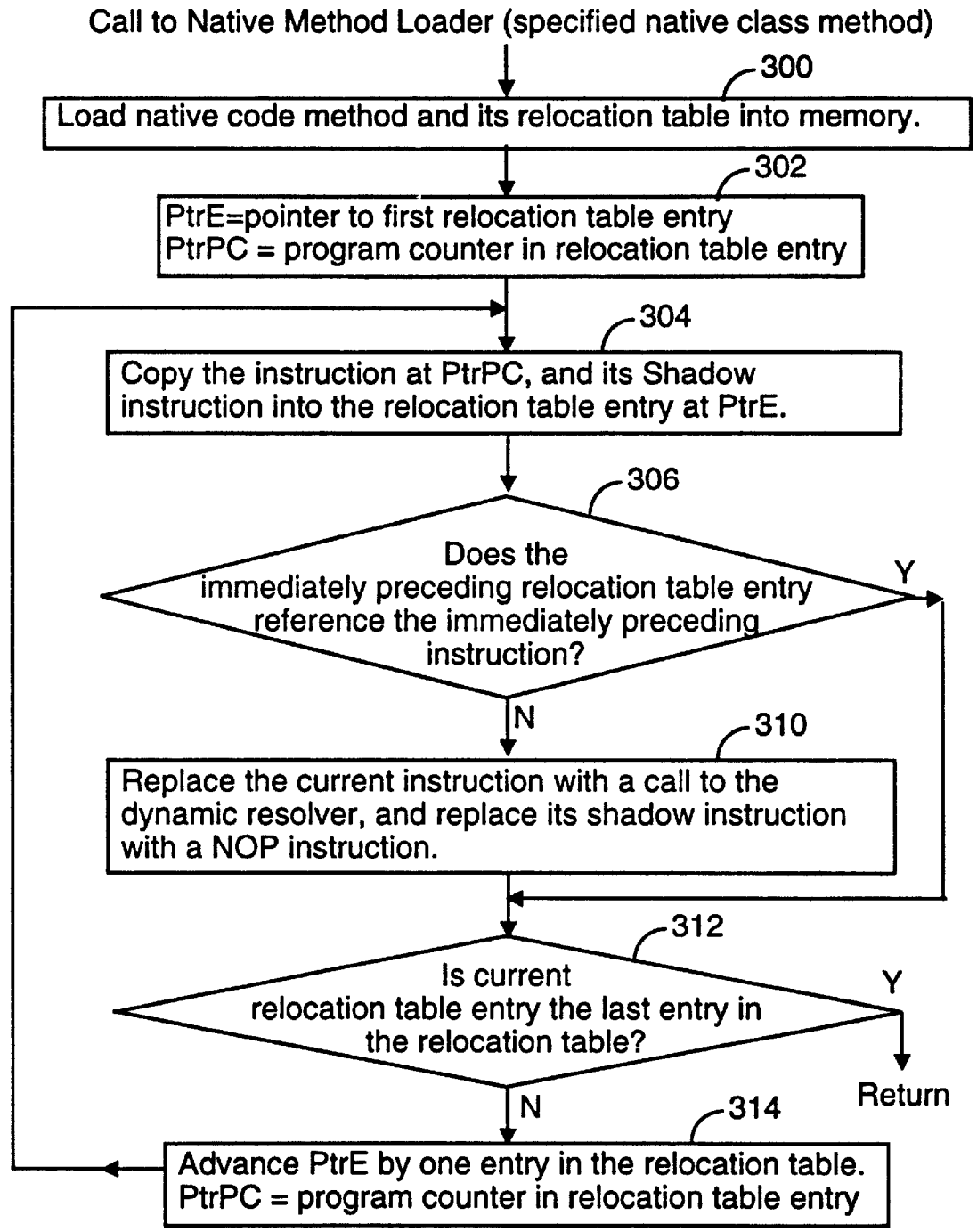
FIG. 5 is a flow chart of the native method loader procedure, which prepares a native code program for execution, in accordance with a preferred embodiment of the present invention.

When the Java class loader 104 loads a class into a user's address space, the class loader 104 invokes the native method loader 216 to load the compiled native code version of any Java bytecode method for which there is a compiled native code version. Referring to FIG. 5, the native method loader loads a specified native code method and its relocation table into memory (300). The relocation table is stored in compressed form in the associated class file because it only stores a small amount of information for each relocatable instruction. The native method loader expands the relocation table when it is loaded into memory so that it has room to store a copy of each relocated instruction. That is, the expanded relocation table includes room for storing two instructions in every entry. In addition, as indicated above, the relative program counter values in the relocation table entries are replaced during loading of the relocation table with the absolute program counter values for the corresponding instructions by adding the base address of the loaded native code to all the relative program counter values initially stored in the relocation table.

After loading the specified native code method and its relocation table into memory, a first pointer (PtrE) is set to point to the first entry in the relocation table and a second pointer (PtrPC) is set to point to the primary instruction referenced by that relocation table entry. The primary instruction at PtrPC and its shadow instruction are both copied into the corresponding entry in the relocation table (304). If the relocation table entry immediately preceding the current entry references the instruction immediately preceding the current primary instruction (i.e., if the current primary instruction and its immediately preceding instruction both reference object components) (306), then step 310 is skipped and the primary instruction and its shadow are not modified. Otherwise (306-N), the current instruction is replaced with an instruction that calls the dynamic resolver and its shadow instruction is replaced with a NOP instruction (310).

If the current instruction is the last instruction in the program (312), then the native method loader exits. Otherwise it advances the first pointer PtrE to the next relocation table entry and the second pointer PtrPC is set to point to the primary instruction referenced by that relocation table entry (314), and then processing of the loaded native code method resumes at step 304.

Figure 6A:
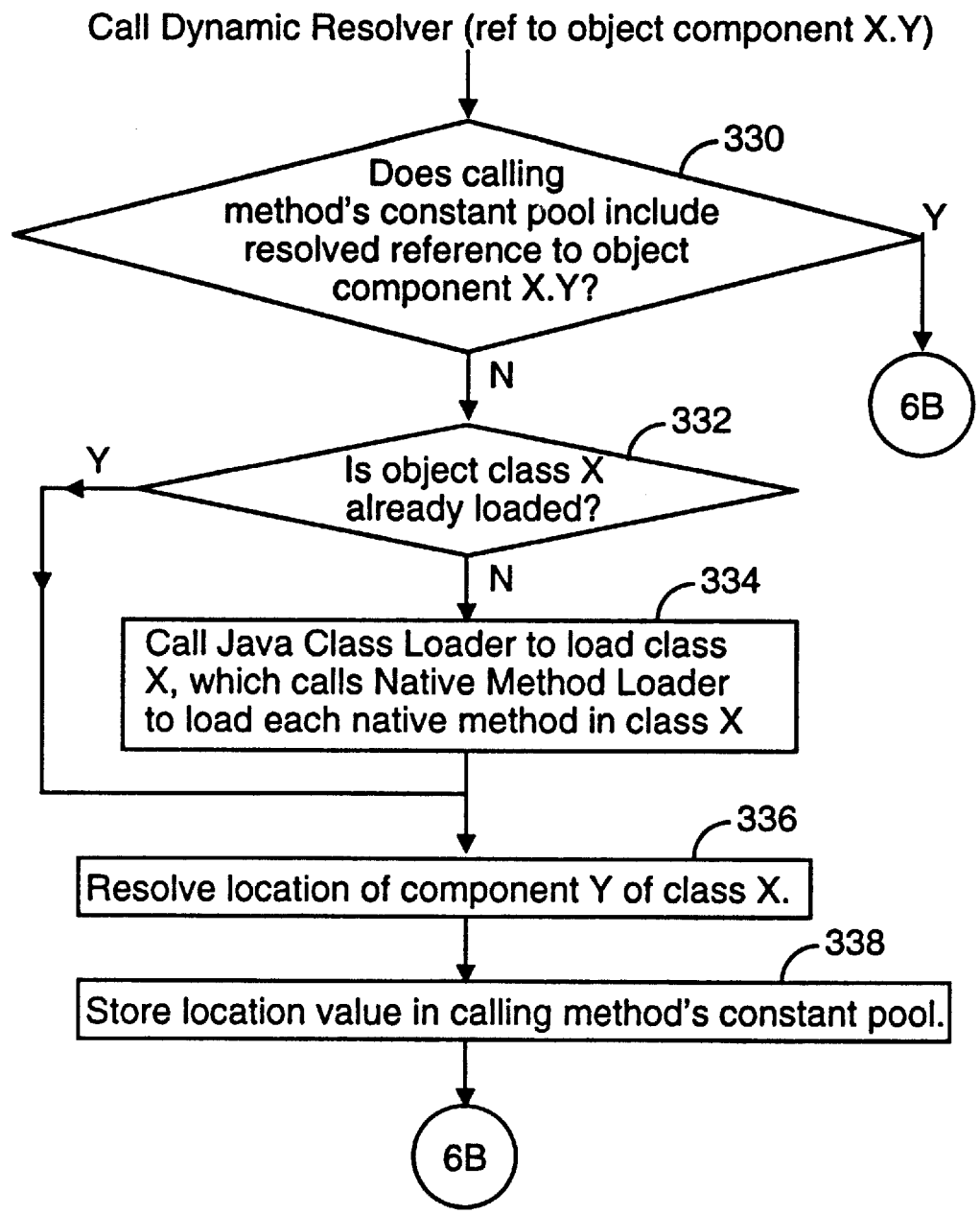
FIG. 6 is a flow chart of the dynamic resolver procedure, which resolves references to object components and dynamically patches the executing method so as to link it to the resolved object components, in accordance with a preferred embodiment of the present invention.
Figure 6B:
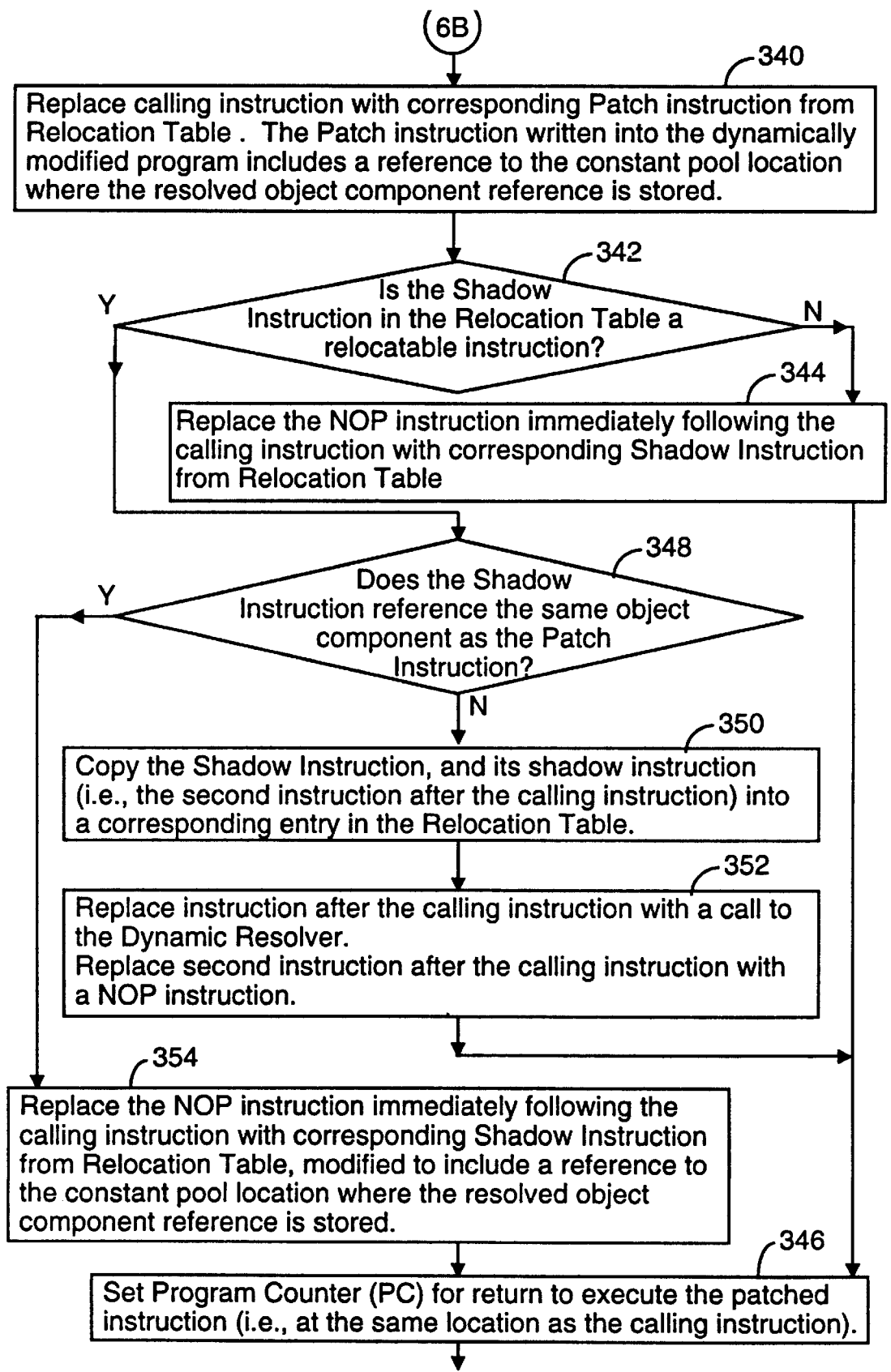

Referring to FIG. 6, when a native code method is executed, it includes instructions generated by the native method loader that call the dynamic resolver. FIG. 6 shows the steps of the procedure performed by the dynamic resolver. When the dynamic resolver is called, the dynamic resolver procedure receives the program counter for the calling instruction, from which it derives a pointer to the relocation table entry for the instruction whose object component reference is to be resolved. That relocation table entry indicates the object component to be dynamically linked to the calling method.

For the purposes of explaining the dynamic loader method, the term "calling instruction" shall refer to the instruction that called the dynamic loader. The calling instruction is the instruction which is to be replaced by a modified version of the corresponding instruction stored in the relocation table. That modified instruction is sometimes herein called the "patch" instruction.

The first step of the dynamic loader procedure is to determine whether the calling method's constant pool already includes a resolved reference to the referenced object component (330). If so (330-Y), processing skips to step 340, which will be discussed below, for modifying the loaded method code. Otherwise (330-N), the referenced object component has not yet been linked to the calling program. In that case, the procedure next determines if the object class of the specified object component is already loaded into the user's address space (332). If not (332-N), the Java class loader is called to load in the object class of the specified object component (334). As noted earlier, the Java class loader calls the native method loader to load each native method in the class that is being loaded.

Next, once the object class of the specified object component has been loaded (334) or has been determined to have been previously loaded (332-Y), the location of the object component is resolved by inspection of the loaded class (336) and the location of the object component is then stored in the calling method's constant pool (338).

Steps 340 to 354 relocate an instruction and its shadow instruction back into the loaded native code. More specifically, the instruction that called the dynamic resolver is replaced by a corresponding "patch" instruction that is constructed from the information in the relocation table (340). In particular, the patch instruction is a copy of the primary instruction (stored in the associated relocation table entry) that has been modified to reference the constant pool location where the resolved object component reference is stored. Then, the procedure determines if the shadow instruction is also a relocatable instruction (342). This determination is made by either inspecting the next relocation table entry to see if its program counter value corresponds to the shadow instruction, or by inspecting the shadow instruction stored in the relocation table entry.

If the shadow instruction is not a relocatable instruction (342-Y), which means that it does not reference an object component, then the NOP instruction immediately following the calling instruction is replaced with the corresponding shadow instruction stored in the relocation table (344). Then the program counter for the calling procedure is modified so that when the dynamic resolver returns control to the calling procedure, the calling procedure will execute the patched instruction at the same location as the instruction that called the dynamic resolver (346).

If the shadow instruction is a relocatable instruction (342-Y), the procedure next determines whether the shadow instruction references the same object component as the patch instruction (i.e., the object component referenced by the primary instruction stored in the relocation table entry) (348). If not, (348-N), the current shadow instruction and its shadow instruction (i.e., the second instruction after the calling instruction) are copied into the corresponding relocation table entry (350), the shadow instruction is replaced with a call to the dynamic resolver and its shadow instruction is replaced with a NOP instruction (352).

If the shadow instruction does reference the same object component as the patched primary instruction (348-Y), the NOP instruction immediately following the patched primary instruction is replaced with a copy of the shadow instruction in the relocation table that has been modified to reference the constant pool location where the resolved object component reference is stored (354).

After the NOP instruction immediately following the patched primary instruction has been replaced (352 or 354), the program counter for the calling procedure is modified so that when the dynamic resolver returns control to the calling procedure, the calling procedure will executed the patched instruction at the same location as the instruction that called the dynamic resolver (346).

In summary, the native method loader and the dynamic resolver work together to cause native code methods having object component references to function as a self-modifying program during execution. All instructions in the native code method that reference object components are replaced by calls to a dynamic resolver procedure. When the dynamic resolver procedure is executed, it resolves the memory location of the object component referenced by the corresponding original instruction and then replaces the calling instruction with a patch instruction. The patch instruction is a version of the corresponding original instruction that includes a resolved reference to the referenced object component. The program counter of the calling native code method is also modified so that after the dynamic resolver procedure returns, the calling procedure executes the patch instruction at the same location as the instruction that called the dynamic resolver.

Alternate Embodiments

In a first alternate embodiment, all relocatable instructions, which are all instructions that reference object components whose location needs to be resolved at run time, are stored in the relocation table by the compiler at compile time, and furthermore those instructions and their shadow instructions are replaced (in the compiled native code) by the compiler with dynamic resolver call instructions and NOP instructions. In other words, in this embodiment the compiler performs all the work previously done by the native method loader, excluding the loading of the native code and relocation table into memory and the adjustment of the program counter values in the relocation table to reflect the absolute memory locations of the corresponding loaded instructions. This first alternate embodiment results in a larger compiled method because the amount of information stored in the relocation table is increased substantially, without decreasing the size of the native code, but also results in faster execution of the compiled code because the native method loading procedure is simplified. Thus this is first alternate embodiment represents a tradeoff of increased storage and memory resource usage for decreased computational resource usage.

In a second alternate embodiment, for use on computers that have variable length instructions but do not have a "delay slot" instruction that must be executed before the preceding call instruction is executed, the native method loader and dynamic resolver are modified somewhat. In such systems, a procedure call will typically be longer than at least some of the other instructions, and therefore when an instruction that references an object component is replaced by a call to the dynamic resolver, additional instructions or instruction portions may be overwritten. These additional instructions or instruction portions will be called "shadow bytes."

Figure 7:
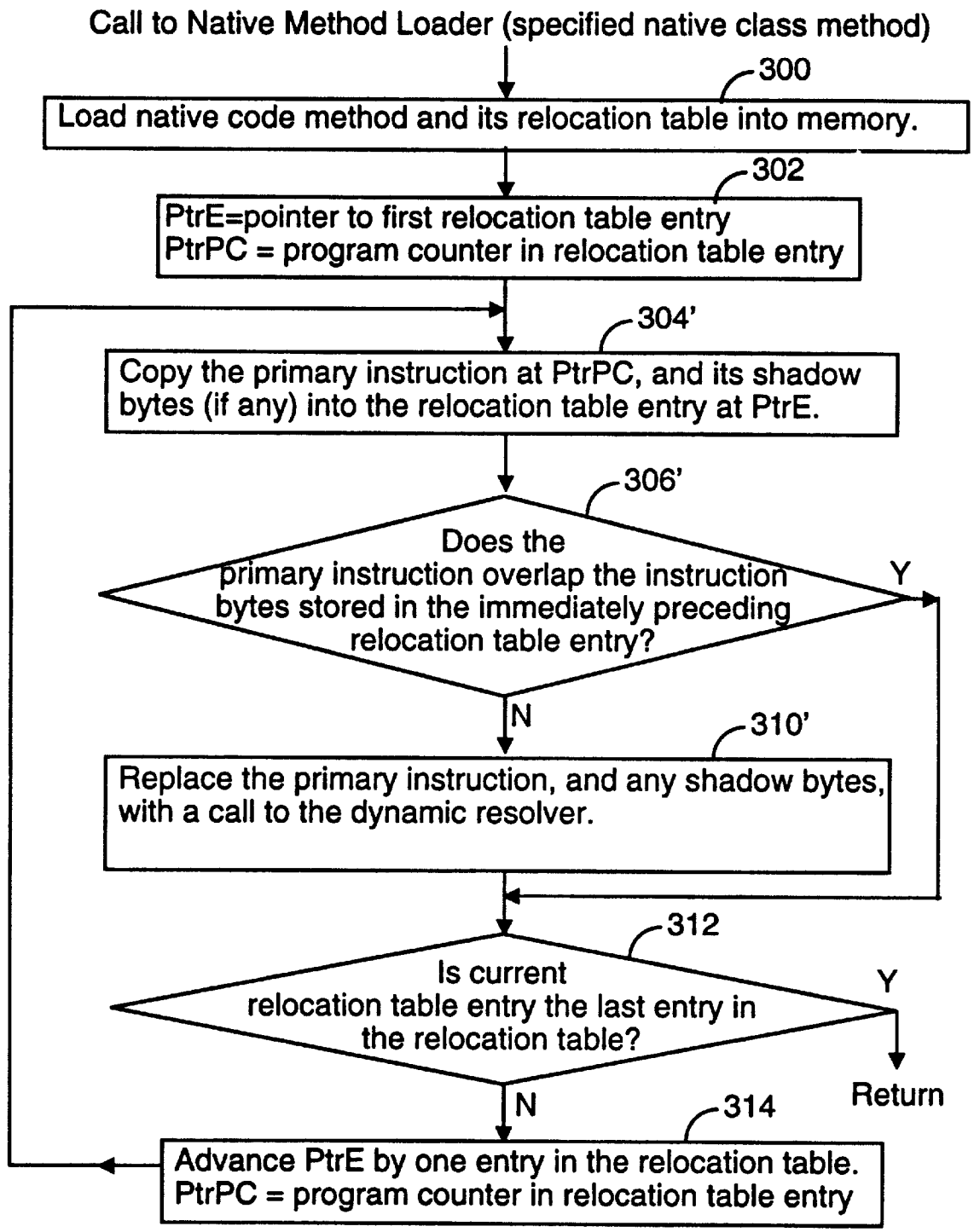
FIG. 7 is a is a flow chart of the native method loader procedure in an alternate embodiment of the present invention.

In this second alternate embodiment, the native method loader, as shown in FIG. 7, step 304' copies a primary instruction and its shadow bytes, if any, into a relocation table entry. There are shadow bytes only if the primary instruction is shorter in length than the instruction for calling the dynamic resolver. Step 310' replaces the primary instruction and its shadow bytes, if any, with a call to the dynamic resolver. Step 306' checks to see if the primary instruction overlaps the instruction bytes stored in the immediately preceding relocation table entry. If so, step 310' is skipped. For instance, if procedure calls occupy five words, and the program counter for the present relocation table entry is less than five words away from the program counter for the preceding relocation table entry, then step 310' is skipped.

Figure 8:
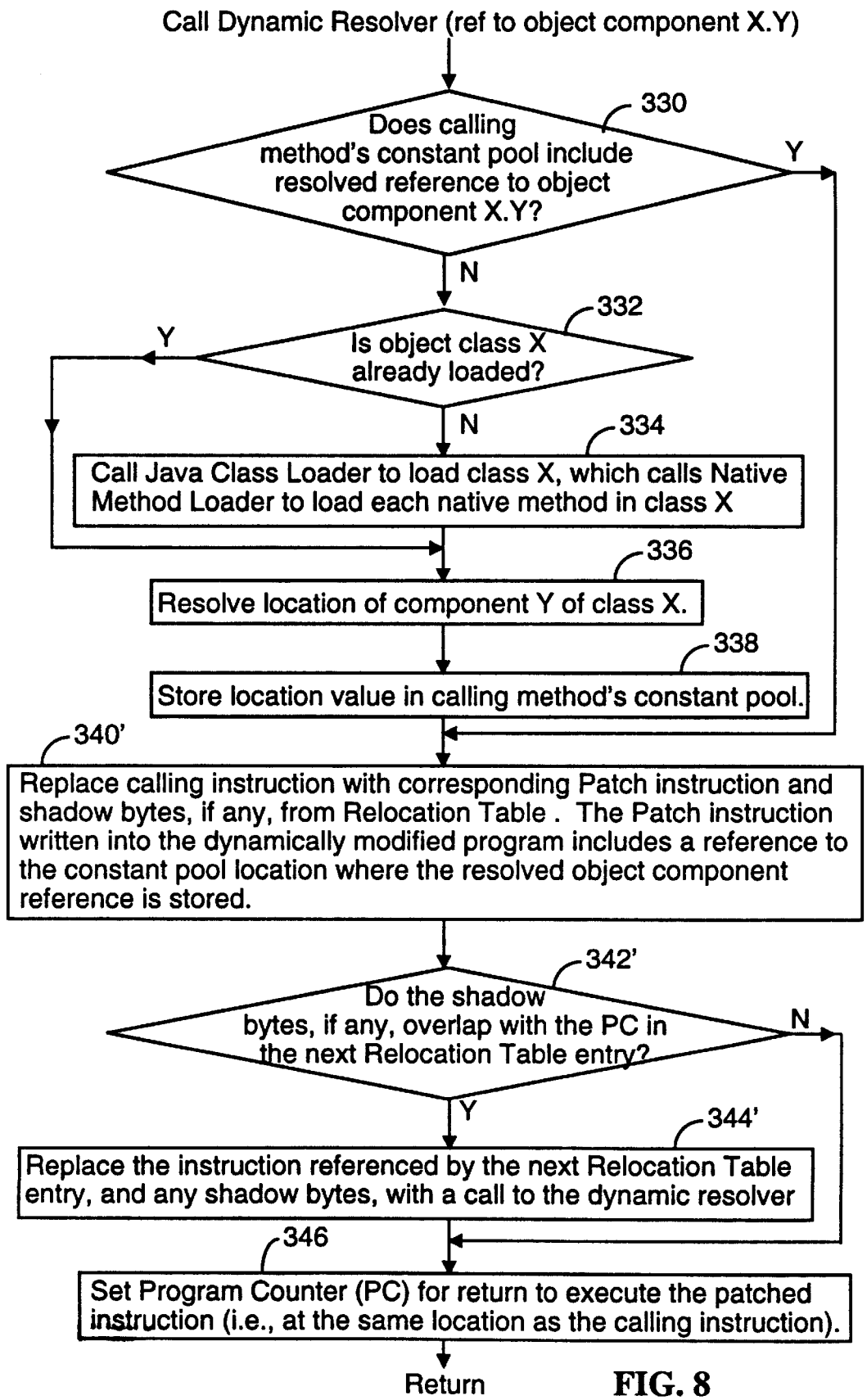
FIG. 8 is a flow chart of the dynamic resolver procedure in an alternate embodiment of the present invention.

Furthermore, the dynamic resolver procedure, as shown in FIG. 8, is simpler in operation because steps 348–354, all of which perform special processing for shadow instructions, are eliminated. Instead, step 340' replaces a calling instruction with the patch instruction and shadow bytes in the corresponding relocation table entry. Then, if the shadow bytes (if any) of the patch instruction overlap with the program counter in the next relocation table entry (342'), the instruction referenced by that next relocation table entry and its shadow bytes are replaced with a call to the dynamic resolver (344').

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of dynamically linking a compiled procedure to referenced object components during execution of the compiled procedure, comprising the steps of:
   (A) prior to executing the compiled procedure, modifying the compiled procedure a first time by replacing a first instruction in the compiled procedure that references a first object component with a replacement instruction that invokes execution of a dynamic resolution procedure;
   (B) executing the compiled procedure, and when execution of the compiled procedure reaches said replacement instruction, executing said replacement instruction by invoking execution of said dynamic resolution procedure so as to link the compiled procedure to said first object component;
   (C) while executing said dynamic resolution procedure, (C1) locating said first object component, (C2) modifying the compiled procedure a second time by replacing said replacement instruction in the compiled procedure with a patch instruction, corresponding to said first instruction, that references said located first object component, (C3) resetting a program counter value associated with execution of the compiled procedure so that when said dynamic resolution procedure returns back to the compiled procedure, said patch instruction is executed next; and (C4) returning back to the compiled procedure; and
   (D) after execution of the dynamic resolution procedure, executing the patch instruction in the modified compiled procedure.

2. The method of claim 1, wherein said step A is performed when the compiled procedure is first loaded into a user's address space.

3. The method of claim 1,
   said step A including replacing a shadow instruction, immediately following said first instruction in the compiled procedure with a NOP instruction; and
   said step C2 including replacing said NOP instruction with said shadow instruction if said shadow instruction does not reference an object component, and otherwise replacing said shadow instruction with a second replacement instruction that invokes execution of said dynamic resolution procedure.

4. The method of claim 1, wherein said step of locating said first object component includes linking the compiled procedure to said first object component by storing a memory address value associated with the located first object component in a constant table associated with the compiled procedure.

5. The method of claim 4, said step of locating said first object further including determining whether an object class associated with the first object component has been loaded into a user's address space, and when said determination is negative, loading said associated object class into said user's address space.

6. The method of claim 1, said step of locating said first object further including determining whether an object class associated with the first object component has been loaded into a user's address space, and when said determination is negative, loading said associated object class into said user's address space.

7. A computer program product for dynamically linking a compiled procedure to referenced object components during execution of the compiled procedure, comprising a computer readable storage medium and a computer program mechanism embedded therein, the computer program mechanism comprising:
   a dynamic resolution procedure for resolving a reference in the compiled procedure to a specified object component; and
   a program loading procedure that loads the compiled procedure into a user's address space and modifies the compiled procedure a first time by replacing a first instruction in the compiled procedure that references a first object component with a replacement instruction that invokes execution of said dynamic resolution procedure;
   said dynamic resolution procedure including instructions for (A) locating said first object component, (B) modifying the compiled procedure a second time by replacing said replacement instruction in the compiled procedure with a patch instruction, corresponding to said first instruction, that references said located first object component, (C) resetting a program counter value associated with execution of the compiled procedure so that when said dynamic resolution procedure returns back to the compiled procedure, said patch instruction is executed next; and (D) returning back to the compiled procedure;

wherein after execution of the replacement instruction in the modified compiled procedure and execution of the dynamic resolution procedure, the compiled procedure has been modified so that the next instruction executed in the modified compiled procedure is the patch instruction.

8. The computer program product of claim 7, said program loading procedure including instructions for replacing a shadow instruction, immediately following said first instruction in the compiled procedure with a NOP instruction; and said dynamic resolution procedure including instructions for replacing said NOP instruction with said shadow instruction if said shadow instruction does not reference an object component, and otherwise replacing said shadow instruction with a second replacement instruction that invokes execution of said dynamic resolution procedure.

9. The computer program product of claim 7, said dynamic resolution procedure including instructions for linking the compiled procedure to said first object component by storing a memory address value associated with the located first object component in a constant table associated with the compiled procedure.

10. The computer program product of claim 9, said dynamic resolution procedure including instructions for determining whether an object class associated with the first object component has been loaded into a user's address space, and when said determination is negative, loading said associated object class into said user's address space.

11. The computer program product of claim 7, said dynamic resolution procedure including instructions for determining whether an object class associated with the first object component has been loaded into a user's address space, and when said determination is negative, loading said associated object class into said user's address space.

12. A method of dynamically linking a compiled procedure to referenced object components during execution of the compiled procedure, comprising the steps of:

(A) while compiling said compiled procedure, modifying the compiled procedure a first time by replacing a first instruction in the compiled procedure that references a first object component with a replacement instruction that invokes execution of a dynamic resolution procedure, and storing said first instruction in a relocation table;

(B) executing the compiled procedure, and when execution of the compiled procedure reaches said replacement instruction, executing said replacement instruction by invoking execution of said dynamic resolution procedure so as to link the compiled procedure to said first object component; and (C) while executing said dynamic resolution procedure, (C1) locating said first object component, (C2) modifying the compiled procedure a second time by replacing said replacement instruction in the compiled procedure with a patch instruction, corresponding to said first instruction stored in said relocation table, that references said located first object component, (C3) resetting a program counter value associated with execution of the compiled procedure so that when said dynamic resolution procedure returns back to the compiled procedure, said patch instruction is executed next; and (C4) returning back to the compiled procedure;

(D) after execution of the dynamic resolution procedure, executing the patch instruction in the modified compiled procedure.

13. The method of claim 12, said step A including replacing a shadow instruction, immediately following said first instruction in the compiled procedure with a NOP instruction; and said step C2 including replacing said NOP instruction with said shadow instruction if said shadow instruction does not reference an object component, and otherwise replacing said shadow instruction with a second replacement instruction that invokes execution of said dynamic resolution procedure.

14. The method of claim 12, said step C1 including linking the compiled procedure to said first object component by storing a memory address value associated with the located first object component in a constant table associated with the compiled procedure.

15. The method of claim 4, said step C1 including determining whether an object class associated with the first object component has been loaded into a user's address space, and when said determination is negative, loading said associated object class into said user's address space.

16. The method of claim 1, said step C1 including determining whether an object class associated with the first object component has been loaded into a user's address space, and when said determination is negative, loading said associated object class into said user's address space.

17. A computer program product for dynamically linking a compiled procedure to referenced object components during execution of the compiled procedure, comprising a computer readable storage medium and a computer program mechanism embedded therein, the computer program mechanism comprising:

a dynamic resolution procedure for resolving a reference in the compiled procedure to a specified object component; and a compiler procedure for generating the compiled procedure, including instructions for modifying the compiled procedure a first time by replacing a first instruction in the compiled procedure that references a first object component with a replacement instruction that invokes execution of the dynamic resolution procedure, and storing said first instruction in a relocation table;

said dynamic resolution procedure including instructions for (A) locating said first object component, (B) modifying the compiled procedure a second time by replacing said replacement instruction in the compiled procedure with a patch instruction, corresponding to said first instruction stored in said relocation table, that references said located first object component, (C) resetting a program counter value associated with execution of the compiled procedure so that when said dynamic resolution procedure returns back to the compiled procedure, said patch instruction is executed next; and (D) returning back to the compiled procedure.

wherein after execution of the replacement instruction in the modified compiled procedure and execution of the dynamic resolution procedure, the compiled procedure has been modified so that the next instruction executed in the modified compiled procedure is the patch instruction.

18. The computer program product of claim 17, said compiler procedure including instructions for replacing a shadow instruction, immediately following said first instruction in the compiled procedure with a NOP instruction; and said dynamic resolution procedure including instructions for replacing said NOP instruction with said shadow instruction if said shadow instruction does not reference an object component, and otherwise replacing said shadow instruction with a second replacement instruction that invokes execution of said dynamic resolution procedure.

19. The computer program product of claim 17, said dynamic resolution procedure including instructions for linking the compiled procedure to said first object component by storing a memory address value associated with the located first object component in a constant table associated with the compiled procedure.

20. The computer program product of claim 19, said dynamic resolution procedure including instructions for determining whether an object class associated with the first object component has been loaded into a user's address space, and when said determination is negative, loading said associated object class into said user's address space.

21. The computer program product of claim 17, said dynamic resolution procedure including instructions for determining whether an object class associated with the first object component has been loaded into a user's address space, and when said determination is negative, loading said associated object class into said user's address space.

* * * * *